(12) United States Patent
Bittermann et al.

(10) Patent No.: US 10,236,733 B2
(45) Date of Patent: Mar. 19, 2019

(54) MAGNETIC MASS FOR ROTOR, ROTOR MANUFACTURING PROCESS AND CORRESPONDING ELECTRICAL MACHINE

(71) Applicant: GE Energy Power Conversion Technology Ltd, Rugby, Warwickshire (GB)

(72) Inventors: Mathieu Bittermann, Champigneulles (FR); Graham Derek Le Flem, Rugby (GB)

(73) Assignee: GE ENERGY POWER CONVERSION TECHNOLOGY LTD, Rugby (GB)

( * ) Notice: Subject to any disclaimer, the term of this patent is extended or adjusted under 35 U.S.C. 154(b) by 168 days.

(21) Appl. No.: 15/001,733

(22) Filed: Jan. 20, 2016

(65) Prior Publication Data
US 2016/0211708 A1 Jul. 21, 2016

(30) Foreign Application Priority Data
Jan. 20, 2015 (EP) .................................... 15305058

(51) Int. Cl.
*H02K 17/00* (2006.01)
*H02K 1/22* (2006.01)
(Continued)

(52) U.S. Cl.
CPC ............... *H02K 1/22* (2013.01); *H01F 7/021* (2013.01); *H02K 5/04* (2013.01); *H02K 15/02* (2013.01);
(Continued)

(58) Field of Classification Search
CPC .. H02K 17/165; H02K 17/16; H02K 15/0012; H02K 17/20
(Continued)

(56) References Cited

U.S. PATENT DOCUMENTS 4,437,230 A * 3/1984 Greutmann ............ H02K 13/04
29/597
4,885,494 A * 12/1989 Higashi .................... H02K 9/19
310/201

(Continued)

FOREIGN PATENT DOCUMENTS

| CN | 1360748 A | 7/2002 |
|---|---|---|
| CN | 1449088 A | 10/2003 |

(Continued)

OTHER PUBLICATIONS

European Search Report issued in connection with corresponding EP application 15305058.8, dated Aug. 27, 2015.
Machine Translation of First Office action and search issued in connection with corresponding CN Application No. 201610036802.7 dated Oct. 31, 2018.

*Primary Examiner* — Hanh N Nguyen
(74) *Attorney, Agent, or Firm* — GE Global Patent Operation; Scott R. Stanley

(57) ABSTRACT

A magnetic mass of an electric machine rotor extending along a longitudinal axis and comprising a plurality of housings, each housing being able to receive a respective electrically conductive bar. The magnetic mass further comprises, on at least one portion of its length along the longitudinal axis, at least one opening extending radially from one of the housings and opening outwards along a radial direction, substantially perpendicular to the longitudinal axis.

13 Claims, 2 Drawing Sheets

(51) Int. Cl.
*H02K 15/02* (2006.01)
*H02K 5/04* (2006.01)
*H02K 17/16* (2006.01)
*H01F 7/02* (2006.01)
*H02K 15/00* (2006.01)

(52) U.S. Cl.
CPC ....... *H02K 17/165* (2013.01); *H02K 15/0012* (2013.01)

(58) Field of Classification Search
USPC .................................................. 310/125, 211
See application file for complete search history.

(56) References Cited

U.S. PATENT DOCUMENTS

2014/0028146 A1* 1/2014 Sugimoto .............. H02K 1/265
310/216.069
2014/0252910 A1* 9/2014 Kunihiro .............. H02K 17/165
310/211

FOREIGN PATENT DOCUMENTS

| CN | 1925283 | A | 3/2007 |
| EP | 0609645 | A1 | 8/1994 |
| JP | S599741 | U | 1/1984 |
| JP | S60255045 | A | 12/1985 |
| JP | 2008278642 | A | 11/2008 |

* cited by examiner

MAGNETIC MASS FOR ROTOR, ROTOR MANUFACTURING PROCESS AND CORRESPONDING ELECTRICAL MACHINE

BACKGROUND

Embodiments of the present invention relate to a magnetic mass for an electric machine rotor and also relates to such a rotor. Embodiments of the present invention also relate to a manufacturing process for such a rotor.

The document EP-A-0 609 645 describes a rotor comprising a magnetic mass and a short-circuit cage. The short-circuit cage comprises two short-circuit rings and a plurality of busbars each electrically connecting the short-circuit rings.

However, such a rotor has a relatively low power factor, of around 0.7 to 0.8. For a technical machine, the power factor is defined as the ratio between active power and apparent power. More the power factor is of major value, approaching the value 1, less excitation current is necessary for the rotor, a very high mechanical torque value for the rotor thus being available for the same electrical power at terminals of the electric machine.

BRIEF DESCRIPTION OF THE INVENTION

Embodiments of the invention provide a rotor allowing a higher value power factor for the electric machine.

For this purpose, embodiments of the invention relate to a magnetic mass of electric machine rotor extending along a longitudinal axis, and comprising a plurality of housings, each housing being likely to receive a respective electrically conductive bar.

Furthermore, the magnetic mass comprises, on at least one portion of its length along the longitudinal axis, at least one opening extending radially from one of the housings and opening outwards along a radial direction, substantially perpendicular to the longitudinal axis.

According to the embodiments of the present invention, the magnetic mass comprises one or more of the following characteristics, taken separately or following all technically possible combinations each opening extends over the entire length of the magnetic mass along the longitudinal axis. The magnetic mass is delimited by a periphery along a plane perpendicular to the longitudinal axis, each opening extending between two longitudinal edges at the periphery of the magnetic body, the distance between the two edges being between 4 mm and 10 mm; the number of openings is equal to the number of housing and each opening extends radially from one of the respective housings and opening outwards along a radial direction; each opening is in the shape of a groove whose cross section perpendicular to the longitudinal axis comprises a first portion of substantially rectangular shape, the first portion opening towards one of the housings, and a second substantially trapezoidal portion into which the first portion opens, the second portion opening outwards along a radial direction. The substantially trapezoidal-shaped second portion comprises a small base radially outward and a large base, the small base being placed outside the large base along the radial direction, the substantially trapezoidal-shaped second portion comprising a side connecting the small base to the large base, said side forming an angle between 5° and 25°, more particularly substantially equal to 15° with the height passing through one of the points of said side.

Embodiments of the invention also relate to an electric machine rotor comprising a magnetic mass as defined above, a short circuit cage extending along the longitudinal axis and comprising two short-circuit rings placed on either side of the magnetic mass along the longitudinal axis, a plurality of electrically conductive bars, each electrically connecting the two short-circuit rings.

For example, the rotor comprises at least one electric or non-magnetic insulating plug, the plug(s) being arranged inside of each opening more particularly inside the second portion, so as to close each opening on at least one portion of its length along the longitudinal axis.

Moreover, embodiments of the invention relate to an electric machine, especially asynchronous machine, particularly a motor, comprising a stator and a rotor as defined above.

Embodiments of the invention also relate to a rotor manufacturing process comprising a construction stage of a magnetic mass extending along a longitudinal axis and comprising a plurality of housings, each housing being likely to receive a bar from the plurality of bars and, on at least one portion of its length along the longitudinal axis, at least one opening extending radially from one of the housings and opening outwards along a radial direction substantially perpendicular to the longitudinal axis; a construction stage of a short-circuit cage extending along the longitudinal axis and comprising two short-circuit rings placed on either side of the magnetic mass along the longitudinal axis, and a plurality of electrically conductive bars, each electrically connecting the two short-circuit rings.

BRIEF DESCRIPTION OF THE DRAWINGS

Other characteristics and advantages of the invention will appear on reading the following description of the invention embodiments, given only as non-limiting examples and in reference to the drawings on which.

DETAILED DESCRIPTION

Conventionally in this application, the expression "substantially equal to" will express a relationship of equality to plus or minus 5%.

Figure 1:
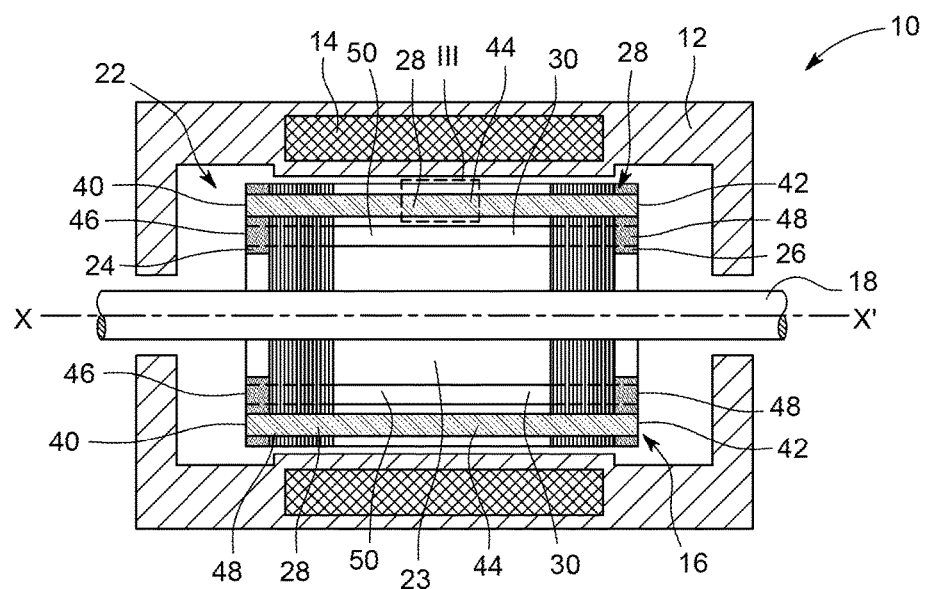
FIG. 1 is a schematic axial sectional view of an electric machine according to an embodiment of the invention.

In FIG. 1 an electric machine is shown according to the invention, denoted by the general reference 10. The electric machine 10 may be, an asynchronous machine, particularly an asynchronous motor.

The machine 10 comprises a frame 12, a stator 14, a rotor 16 and a shaft 18.

The machine 10 is adapted to operate at very high rotation speeds, for example ranging from 3000 rpm to 20,000 rpm and is of high electrical power, for example greater than 10 megawatts (MW), more particularly greater than 50 MW.

The frame 12 and the stator 14 are known elements, and are thus not described in more detail.

The rotor 16 defines an axis of rotation X-X' also called longitudinal axis. In what follows, the expression "axially", "radially" and "circumferentially" will be used with respect to the axis X-X'.

The rotor 16 is secured to the shaft 18, and comprises a short-circuit cage 22 and a magnetic mass 23.

The rotor 16 is a rotor of large mass, for example greater than 1000 kilograms (kg), more particularly greater than 10,000 kg.

The short-circuit cage 22 comprises a first electrical short-circuit ring 24, a second electrical short-circuit ring 26 and a plurality of electrically conductive bars 28.

The magnetic mass 23 comprises a stack of rotor panels 30 and tie rods for holding the stack.

The magnetic mass 23 extends along a longitudinal axis X-X' and is delimited by a periphery.

The magnetic mass 23 comprises a plurality of bar housings 32, a plurality of traversing longitudinal holes 38 suitably to receive the tie rods 30, a plurality of openings 34 and a plurality of plugs 35.

The first short-circuit ring 24 and the second short-circuit ring 26 are identical.

Each short-circuit ring 24, 26 is a circular disc placed coaxially to the axis of rotation X-X'. The first short-circuit ring 24 is placed on one axial side of the magnetic mass 23 while the second short-circuit ring 26 is placed on the other axial side of the magnetic mass 23.

Each short-circuit ring 24, 26 is fixed axially with respect to the magnetic body 23 or with respect to the shaft 18. Each short-circuit ring 24, 26 is, for example, shrunk on the shaft 18 or fastened to the magnetic mass 23. Alternatively, the short-circuit ring 24, 26 is fastened to any other intermediate part secured to the shaft 18 or the magnetic mass 23.

Each short-circuit ring 24, 26 is, for example, made of metal, more particularly made of copper. In an embodiment, each short-circuit ring 24, 26 is made in one piece, particularly from a single part.

Each short-circuit ring 24, 26 is fitted with a plurality of axial cavities 36, 38. Each first axial cavity 36 is likely to receive a respective bar 28. Each second axial cavity 38 is likely to receive a respective tie rod 30.

Each bar 28 comprises a first end portion 40, a second end portion 42 and a middle portion 44 extending between the end portions 40, 42. The bars 28 are, for example, made of metal, such as copper. The bars 28 are placed parallel to the axis of rotation X-X. Moreover, the middle portion 44 has a circular section.

Each bar 28 is made in one piece, particularly from a single part. The first end portion 40 is mechanically and electrically connected to the first short-circuit ring 24. The second end portion 42 is also electrically and mechanically connected to the second short-circuit ring 26.

Each bar 30 comprises a first end portion 46, a second end portion 48 and a middle portion 50 extending between the end portions 46, 48. The tie rods 30 are of a material having a greater rigidity than the material of the rods 28. The tie rods 30 are placed parallel to the axis of rotation X-X'. Moreover, the middle portion 50 of the tie rods 30 has a circular section. Each tie rod 30 is made in one piece, particularly from a single part. The tie rods 30 enable to ensure mechanical holding of the stack of rotor panels by pressing against the short circuit rings 24, 26.

The number of bar housings 32 is the same as the number of bars 28. Thus, with each bar 28, a respective bar housing 32 is associated. Each bar housing 32 has an additional cross section from the middle portion 44 of the bar 28. This cross-section is thus circular in the example shown. Each housing 32 has a diameter marked $\Phi 1$ after. In addition, each housing 32 extends at the level of short-circuit rings 24, 26 in the first two axial cavities 36.

The number of traversing longitudinal holes 38 is the same as the number of tie rods 30. Thus, with each tie rod 30, a respective traversing longitudinal hole 38 is associated.

Each traversing longitudinal hole 38 has an additional cross section from the middle portion 50 of the tie rod 30. This cross-section is thus circular in the example shown. In addition, each hole 38 extends at the level of short-circuit rings 24, 26.

The number of openings 34 is equal to the number of housing 32. Thus, with each opening 34, a respective bar housing 32 is associated.

Each opening 34 extends radially from one of the respective housings 32 and opens to outside of the magnetic mass 23 along a radial direction substantially perpendicular to the longitudinal axis X-X'.

Figure 3:
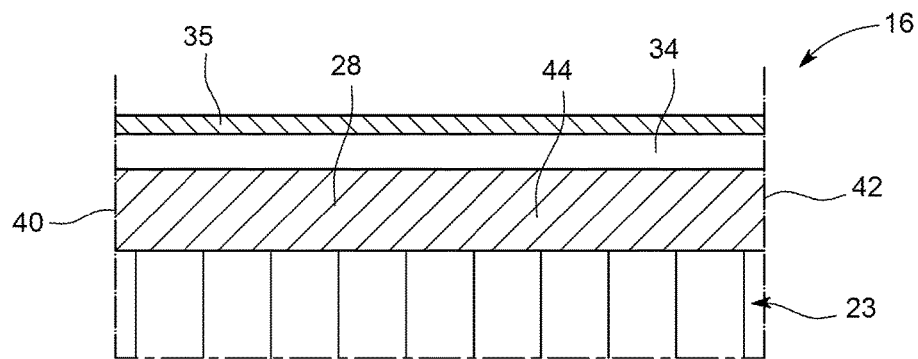
FIG. 3 is an axial sectional view along the line III-III in FIG. 2.

As visible in FIG. 3, each opening 34 extends over the entire length along the longitudinal axis X-X' of the magnetic mass 23. Alternatively, some openings 34 extend only over one part of the length along the longitudinal axis X-X' of the magnetic mass 23.

Figure 2:
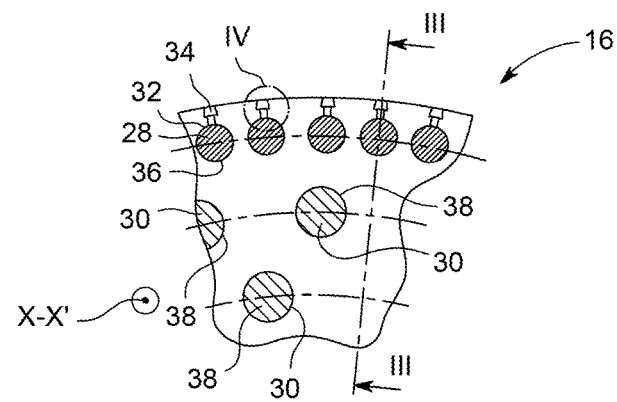
FIG. 2 is a cross-sectional view of a part of the machine rotor in FIG. 1.
Figure 4:
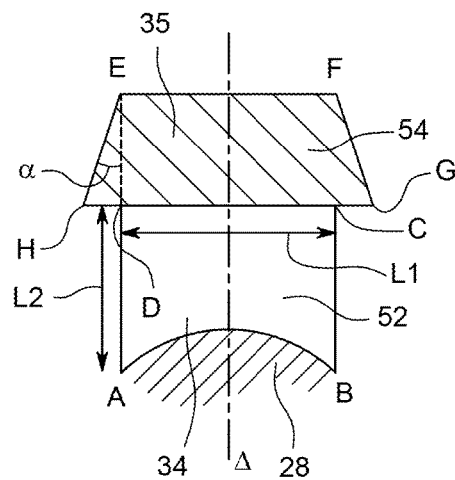
FIG. 4 is an enlargement of the encircled area IV in FIG. 2.

As shown in FIGS. 2 and 4, the opening 34 is a groove whose cross section perpendicular to the longitudinal axis X-X' of the opening 34 is substantially constant along the longitudinal axis X-X'.

The cross section of the opening 34 is detailed in FIG. 4. The cross section of the opening 34 comprises two portions 52, 54. The first portion 52 extends between a part of the bar housing 32 and the second portion 54. The second portion 54 opens from the first portion 52 to outside of the magnetic mass 23.

The first portion 52 substantially has the shape of a rectangle ABCD. The first portion 52 has a length denoted L1 and a width denoted L2. As visible in FIG. 4, L1=AB=CD and L2=AD=BC.

The ratio between the length L1 of the first portion 52 and the diameter $\Phi 1$ of the housing 32 is between 0.1 and 0.4. More particularly, the ratio between the length L1 of the first portion 52 and the diameter $\Phi 1$ of the housing 32 is between 0.2 and 0.3. More particularly, the ratio between the length L1 of the first portion 52 and the diameter $\Phi 1$ of the housing 32 is equal to 0.25. The diameter $\Phi 1$ of the housing 32 is, for example, between 10 mm and 50 mm, more particularly between 30 and 40 mm.

The length L1 of the first portion 52 is, for example, between 4 millimeter (mm) and 10 mm. More particularly, the length L1 is substantially equal to 8 mm.

The width L2 of the first portion 52 is, for example, between 4 mm and 10 mm. More particularly, the length L2 is substantially equal to 6 mm.

The second portion 54 has the shape of an isosceles trapezium EFGH. The trapezium EFGH comprises a small base EF and a large base GH. The first portion 52 opens into the second portion 54 at the large base GH substantially in its middle. Otherwise formulated, the bisectors of the large base GH and the segment CD of the first portion 52 are combined. The corresponding straight line $\Delta$ is shown in FIG. 4. In an embodiment, the length L1 of the first portion 52 is equal to the length of the small base EF of the trapezium EFGH.

The size ratio between the small base EF and the large base is such that the angle $\alpha$ formed by the side EH and the height through E is between 5° and 25°, more particularly substantially equal to 15°.

The small base EF has a length between 4 mm and 10 mm. More particularly, the length of the small base EF is equal to 8 mm. Otherwise formulated, each opening 34 extends between two longitudinal edges E and F to the periphery of the magnetic mass 23, the distance between the two edges is between 4 mm and 10 mm.

The length of the height of the trapezium EFGH is between 4 mm and 10 mm. More particularly, the length of the height is equal to 8 mm.

Each plug 35 is made of electrically insulating material. Alternatively, some plugs 35 are made of non-magnetic metallic material, such as stainless steel.

Each plug 35 is arranged in each opening 34 so as to close each opening 34 on at least a portion of the length of the opening 34 along the longitudinal axis X-X'.

The plug 35 is of shape complementary to the shape of the second portion 54. In this case, the section perpendicular to the longitudinal axis X-X' of the plug 35 is constant along the longitudinal axis X-X' and according to the perpendicular section, the shape of the plug 35 is trapezoidal. Alternatively, the plug 35 closes the first portion 52 and the second portion 54.

The plug 35 enables to isolate the opening 34 from the outside, and particularly to prevent dust from coming to settle in the opening 34. The plug 35 thus enables to describe the whistling noise generated by the opening 34 when the rotor 16 is in rotation. The plug 35 also reduces the friction losses in the air when the rotor 16 is in rotation, since the outer surface of the magnetic mass 23 is smoother, less "rugged" and less rough, when the openings 34 are provided with plugs 35. The choice of the angle α enables to have a self-locking effect for the plug 35 in the trapezoidal-shaped second portion 54 through outer radial force exerted on the plug 35 by the centrifugal force of rotation. An angle α of very low value causes a very large radial displacement towards outside of the plug 35 under the effect of centrifugal force. Alternatively, there can be an air flow in the unclosed first portion 52, so as to take out the heat to the bar 28 carrying an electric current and thus reducing heating of the bar 28. The empty space of the first portion 52 between the plug 35 in the second portion 54 of the bar 28 alternatively constitutes an air duct.

The rotor 16 is particularly manufactured as follows.

First of all, different magnetic rotor panels forming the magnetic mass 23 are cut with the profile as described in reference to FIG. 2. Thus the housings 32, the openings 34 and the longitudinal holes 38 are formed by cutting the rotor panel from the magnetic mass 23. Alternatively, the housings 32, the openings 34 and the longitudinal holes 38 are made by machining of the magnetic mass 23.

Manufacturing of the magnetic mass 23 comprises insertion of the tie rods 30 into the longitudinal hole 38. The magnetic mass 23 is thus particularly easy to manufacture, while compacting all the rotor panels under axial pressure through the tension force of the tie rods 30 for holding the stack.

Then the bars 28 are placed around the magnetic mass 23 in their respective housing 32, and are mechanically and electrically connected to the short-circuit rings 24, 26. Finally, the plugs 35 are inserted into the openings 34 in the second portion 54. Alternatively, the plugs 35 are inserted into the openings 34 before inserting the bars 28 into their housing 32.

The expert will understand the benefit of the openings 34 and their particular profile as shown in FIG. 4, applied to electrical machines, particularly asynchronous, of high power and operating at very high rotation speeds. Such rotors 16 without opening 34 have a relatively low power factor of around 0.7 to 0.8, but also with the risk of not controlling its value between the predictive calculation and its actual measurement during testing of operation of the electric machine.

Indeed, the magnetic flux lines tend to concentrate at the periphery of the magnetic mass 23. The density of these magnetic flux lines is large, which generates a strong induction in the periphery of the magnetic mass 23, particularly in the area between the bars 28 of the short-circuit cage and the outer diameter of the rotor magnetic panels. The radial distance between the bar 28 and the periphery of the magnetic mass 23 is minimal in this place, causing a density of magnetic flux lines and an associated induction of large values. This induces saturation in this place in the rotor magnetic panels, and thus increases the excitation current of the rotor.

The saturation makes precise calculation of the electrical operating point of the rotating electric machine difficult, and therefore makes it difficult to ascertain the value of power factor of an electric machine with such a rotor 16 without opening 34.

The openings 34 interrupt the conduction of magnetic flux at periphery of the magnetic mass 23. The magnetic flux lines of the rotor are closed with those of the stator while passing from the periphery of the magnetic mass 23 between the bars 28 while going around the bars 28, the flux lines can no longer pass at periphery of the magnetic mass 23 interrupted by the openings 34. Thus, there is less density of flux lines because there is more space in the magnetic panels between and around the bars 28 as between the bars 28 and the periphery of the rotor magnetic panels. The invention thus has the advantage to avoid saturation of the rotor magnetic panels for asynchronous electric machines of high power and high rotation speed, which enables to reduce the excitation current of the rotor 16, to increase the factor power to a value greater than 0.8, more particularly greater than or equal to 0.85, and to control its value by absence of saturation in the rotor panels of the magnetic mass 23.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A magnetic mass of an electric machine rotor extending along a longitudinal axis, and comprising a plurality of housings, each housing being able to receive a respective electrically conductive bar, wherein the magnetic mass further comprises, on at least one portion of its length along the longitudinal axis:

at least one opening extending radially from one of the housings and opening outwards along a radial direction, perpendicular to the longitudinal axis, each opening comprising a first portion of rectangular shape and a second portion of trapezoidal shape into which the first portion opens, the second portion extending to a periphery of the magnetic mass.

2. The magnetic mass according to the claim 1, wherein each opening extends over the entire length of the magnetic mass along the longitudinal axis.

3. The magnetic mass according to claim 2, wherein the magnetic mass is delimited by a periphery along a plane perpendicular to the longitudinal axis, each opening extending between two longitudinal edges at the periphery of the magnetic mass, the distance between the two edges being between 4 mm and 10 mm.

4. The magnetic mass according to claim 1, wherein the magnetic mass is delimited by a periphery along a plane perpendicular to the longitudinal axis, each opening extending between two longitudinal edges at the periphery of the magnetic mass, the distance between the two edges being between 4 mm and 10 mm.

5. The magnetic mass according to claim 4, wherein the number of openings is equal to the number of housings and wherein each opening extends radially from one of the respective housings and opening outwards along a radial direction.

6. The magnetic mass according to claim 1, wherein each opening is in the shape of a groove.

7. The magnetic mass according to claim 6, wherein the second portion of trapezoidal shape comprises a small base radially outward and a large base, the small base being placed outside the large base along the radial direction, and wherein the second portion of trapezoidal shape comprises a side connecting the small base to the large base, said side forming an angle between 5° and 25° with the height passing through one of the points of said side.

8. A rotor of an electric machine comprising:
   a magnetic mass of an electric machine rotor extending along a longitudinal axis, and comprising a plurality of housings, each housing being able to receive a respective electrically conductive bar, wherein the magnetic mass further comprises, on at least one portion of its length along the longitudinal axis:
      at least one opening extending radially from one of the housings and opening outwards along a radial direction, perpendicular to the longitudinal axis, each opening comprising a first portion of rectangular shape and a second portion of trapezoidal shape into which the first portion opens, the second portion extending to a periphery of the magnetic mass; and
   a short-circuit cage extending along the longitudinal axis and comprising:
      two short-circuit rings placed on either side of the magnetic mass along the longitudinal axis,
      a plurality of electrically conductive bars, each electrically connecting the two short-circuit rings.

9. The rotor according to claim 8, comprising at least one electrically insulating or non-magnetic plug, or the plugs being arranged inside the each opening, more particularly inside the second portion so as to close the each opening on at least one portion of its length along the longitudinal axis.

10. An electric machine, particularly asynchronous machine, especially motor, comprising a stator and a rotor, wherein the rotor is a rotor according to claim 9.

11. An electric machine, particularly asynchronous machine, especially motor, comprising a stator and a rotor, wherein the rotor is a rotor according to claim 8.

12. A method for manufacturing a rotor according to claim 8 comprising:
   constructing a magnetic mass extending along a longitudinal axis comprising:
      a plurality of housings, each housing being able to receive a bar from the plurality of bars, on at least one portion of its length along the longitudinal axis at least one opening extending radially from one of the housings and opening outwards following a radial direction perpendicular to the longitudinal axis;
   constructing a short-circuit cage extending along the longitudinal axis and comprising:
      two short-circuit rings placed on either side of the magnetic mass along the longitudinal axis, and
      a plurality of electrically conductive bars, each electrically connecting the two short-circuit rings.

13. A method for manufacturing a rotor according to claim 8 comprising:
   constructing a magnetic mass extending along a longitudinal axis comprising:
      a plurality of housings, each housing being able to receive a bar from the plurality of bars,
      on at least one portion of its length along the longitudinal axis at least one opening extending radially from one of the housings and opening outwards following a radial direction perpendicular to the longitudinal axis;
   constructing a short-circuit cage extending along the longitudinal axis and comprising:
      two short-circuit rings placed on either side of the magnetic mass along the longitudinal axis, and
      a plurality of electrically conductive bars, each electrically connecting the two short-circuit rings.

* * * * *